(12) United States Patent
Leung et al.

(10) Patent No.: US 7,047,333 B2
(45) Date of Patent: May 16, 2006

(54) METHOD FOR THE SERIAL TRANSFER OF DATA BETWEEN TWO ELECTRONIC BUS STATIONS AND COMMUNICATION SYSTEM

(75) Inventors: Franken Leung, City Garden (CN); Matthew Au, Shatin (CN); Michael Chan, Ma On Shan (CN); Lawrence Tse, Tsuen Wan (CN)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/487,488

(22) PCT Filed: Aug. 10, 2002

(86) PCT No.: PCT/EP02/08974

§ 371 (c)(1),
(2), (4) Date: Aug. 5, 2004

(87) PCT Pub. No.: WO03/019400

PCT Pub. Date: Mar. 6, 2003

(65) Prior Publication Data

US 2004/0267989 A1    Dec. 30, 2004

(30) Foreign Application Priority Data

Aug. 24, 2001   (EP)   ................... 01250308

(51) Int. Cl.
  *G06F 13/00*   (2006.01)
(52) U.S. Cl. ........................ 710/100; 710/33
(58) Field of Classification Search ............... 710/100, 710/107, 117, 33, 45; 713/400, 320, 323; 340/825, 2.8, 286.01; 370/438, 341, 433, 370/324, 912; 375/219, 220; 455/153.2; 709/232, 238, 253
See application file for complete search history.

(56) References Cited

U.S. PATENT DOCUMENTS

| 4,320,452 A | * | 3/1982 | Kempf et al. ................ 710/107 |
| 4,962,378 A | * | 10/1990 | Fadem .................... 340/825.5 |
| 5,109,543 A | * | 4/1992 | Dissosway et al. ...... 455/170.1 |
| 6,012,105 A | * | 1/2000 | Rubbmark et al. ............ 710/14 |
| 6,141,424 A | | 10/2000 | Takiguchi et al. ............. 381/74 |
| 6,247,994 B1 | * | 6/2001 | DeAngelis et al. .......... 446/454 |

FOREIGN PATENT DOCUMENTS

| EP | 506330 | 9/1992 |
| EP | 1081601 | 3/2001 |

(Continued)

OTHER PUBLICATIONS

"Communication, control, and data acquisition systems on the ISHTE lander" by Olson et al. (abstract only)☐☐ Publication Date: Jan. 1985.*
Copy of search report dated Dec. 16, 2002.

* cited by examiner

*Primary Examiner*—Gopal C. Ray
(74) *Attorney, Agent, or Firm*—Joseph J. Laks; Robert D. Shedd; Paul P. Kiel

(57) ABSTRACT

The invention relates to a serial data transfer method for exchanging data between two electronic bus stations. The bus connection consists of two lines, the first line being dedicated to data/control signals and the second line being dedicated to a power supply voltage. Data transfer is started by pulling the first line to an activated potential for a first period of time, and then leaving the first line inactive for a second period of time. Data transmission commences via the first and second lines after the second period of time has elapsed. Preferably, data is transferred in a number of blocks in the data frame.

15 Claims, 3 Drawing Sheets

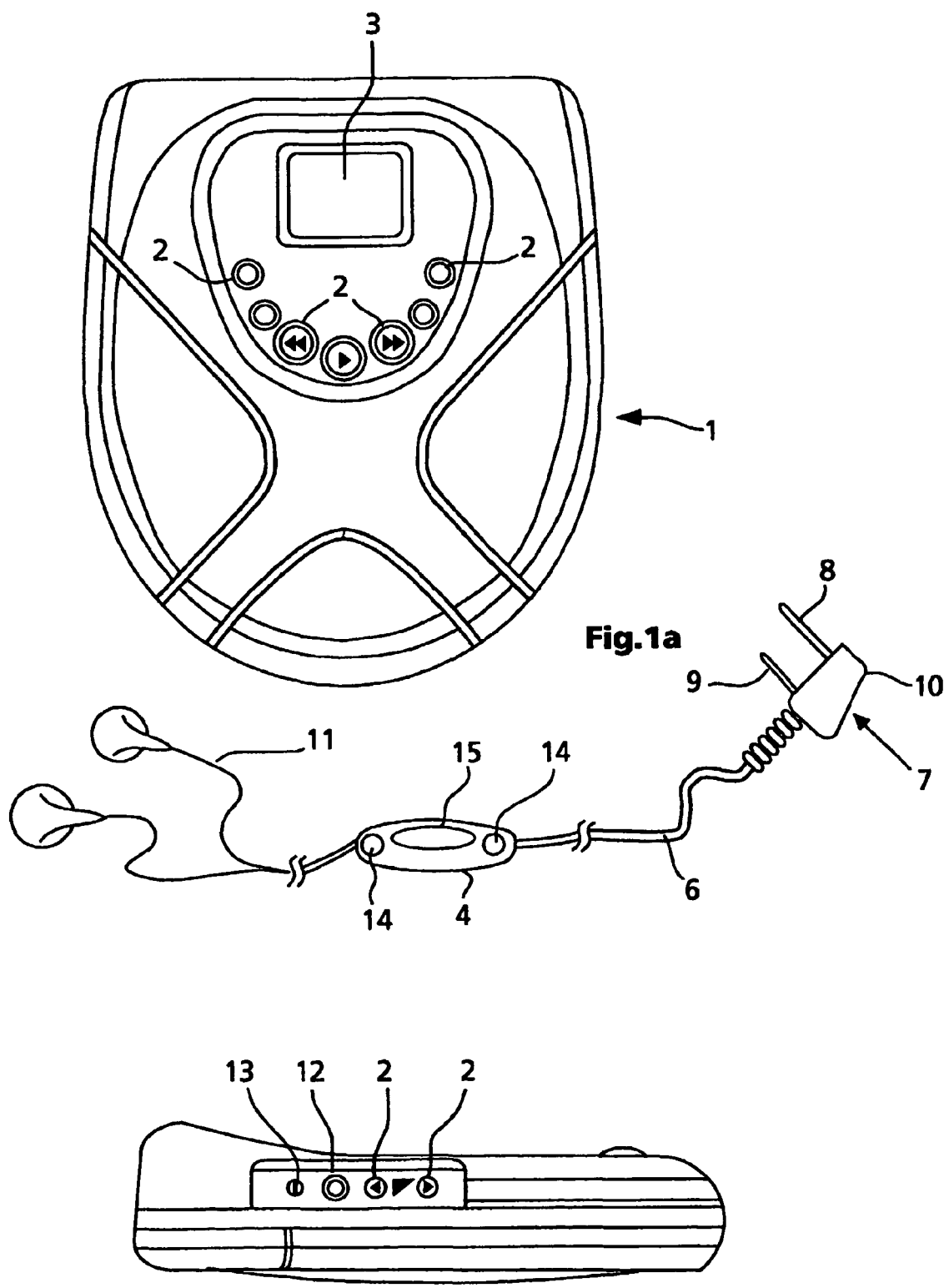

Figure 2A:
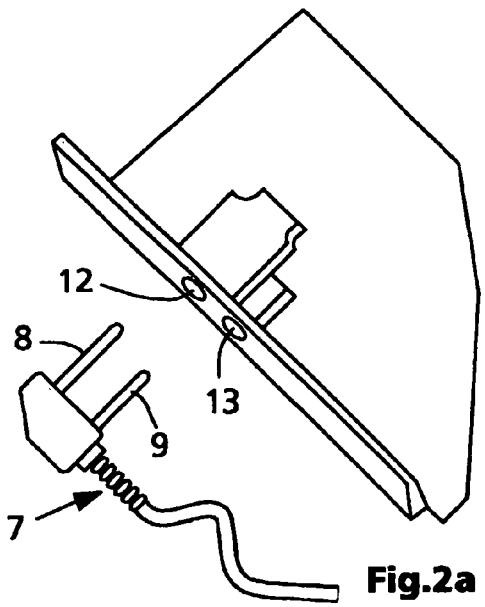

METHOD FOR THE SERIAL TRANSFER OF DATA BETWEEN TWO ELECTRONIC BUS STATIONS AND COMMUNICATION SYSTEM

This application claims the benefit, under 35 U.S.C. § 365 of International Application PCT/EP02/08974, filed Aug. 10, 2002, which was published in accordance with PCT Article 21(2) on Mar. 6, 2003 in English and which claims the benefit of European patent application No. 01250308.2, filed Aug. 24, 2001.

The present invention relates to a method for the serial transfer of data between two electronic bus stations over a bus connection and to a communication system comprising a transmitting station and a receiving station between which a serial data transfer can take place.

BACKGROUND

Consumer electronic products being equipped with a wired remote control are known from the prior art. Especially for portable consumer electronic products such as CD players, cassette players, MP3 players, etc. these wired remote controls are used frequently. For these audio devices, as listed above, some headphones belong to the first priority peripheral equipment of these devices. An advantageous solution is to combine the headphones with the wired remote control so that only one single cable is necessary for connecting the headphones and the wired remote control to the portable device.

Recently, the wired remote controls have taken over the additional function of informing the user about operation modes, recorded titles, and any kind of user information by means of the implementation of a small display in the wired remote control. The display can be of any type but at present usually an LCD display is used for this purpose. In this case, the display data can either be generated in the wired remote control itself or the data can be transferred from the portable device to the wired remote control in another embodiment. The first alternative requires a relatively expensive memory device for the display data in the wired remote control and also some more powerful micro-controller for the generation of the data signals evaluating user controls etc. The required remote control should of course be light weighted, and small sized so that the first embodiment is more difficult to achieve under these constraints. That is why the second alternative solution is preferred, mostly. But in that case all LCD display data needs to be transferred to the wired remote control from the portable device and this calls for an effective communication system and communication method between the portable device and the wired remote control. Also the number of wires necessary for the communication shall be as small as possible in order to assure the lightest weight cable connection and the best protection against electromagnetic interferences.

Under these constraints a serial bus communication is considered best to fulfill the requirements.

INVENTION

It is an object of the invention to disclose an efficient serial bus protocol for a communication between two bus stations that fulfills the following requirements: For power saving reasons the remote controller shall be in a power saving operating mode during most of the time a portable device is running. Therefore, the communication protocol shall guarantee that the remote controller is awaked from sleep mode into normal operation mode during starting a data transferal to the remote controller without data losses and therefore without the necessity to repeat a data transfer because of the sleeping of the wired remote controller. This object is achieved by means of the method steps in claim 1:
i) starting a data transfer in a first direction by pulling the first line to an activated potential for a first period of time;
ii) after elapse of the first period of time leaving said first line inactive for a second period of time; and
iii) commencing data transmission via said first and second line after elapse of said second period of time.

Before starting a data transfer the data/control line for the serial data connection is in an idle state, which corresponds to an inactivated state. The starting of the data transfer is notified by pulling the first data line to an activated potential as defined in step i) of claim 1. The remote controller will be awaked from sleep mode into normal operating mode upon detection of the activated potential on the first data line. A prerequisite for this is that the remote controller polls the first data line repeatedly in a certain period also in sleep mode. The length of the time period during which the first data line is polled to the activated potential needs to be slightly longer than the polling period. The remote controller changes its sleep mode state to normal operation mode after detecting the activated potential on the first data line. It requires some time to stabilize the fast clock signal for the normal operation mode. This time is guaranteed in the communication protocol by means of step ii), where the first data line remains inactive for a certain period of time. Of course, this time period is long enough so that the remote controller can stabilize its clock even if the activated potential has been detected at the end of the first period of time. The data transfer commences only after elapse of said second period of time and this guarantees that the remote controller is working in its normal operation mode when the first data signals are transferred.

Advantageously, additional embodiments of the inventive method are disclosed in the respective dependent claims.

Preferably, data is transmitted after said second period of time in form of blocks with some small idling time between each two blocks in which the data/control line remains in said inactive state. This has the advantage that the remote controller can buffer the data words in each block during the idling time and also it can perform a checksum calculation during this time.

It is also advantageous if the first block that is transferred in a data frame is a synchronization block in which a specific bit pattern is transferred for synchronization purposes. This measure allows for a recalibration of the sampling time points in the remote controller before data words are sampled.

The idling time after the Sync-block can be longer than the idling time between two data blocks. This gives the remote µP time to prepare the reception of the following data blocks.

For the case that the number of data blocks transferred in one data frame shall be variable, it is advantageous to transmitt an information block ahead of the data blocks. In the information block the number of following data blocks shall be contained.

Advantageously the last block that is transferred contains a checksum for the data frame. This allows for a simple error check in the remote controller by comparing the calculated checksum with the transferred checksum.

In this connection it is also advantageous that the receiving station pulls the data/control line to said activated potential if both checksums correspond to each other in order to make an acknowledgment of the safe receipt of the data frame. This is a very simple acknowledgement message that does not produce any overhead and enables to leave the interface circuit in the remote controller as simple as possible, i.e. it does not need to have full data transmission capability.

An advantageous communication system according to the invention is claimed in independent claim 12. Further advantageous embodiments of this communication system are apparent from dependent claims 13 to 15 (see also the explanations above).

DRAWINGS

Figure 2B:
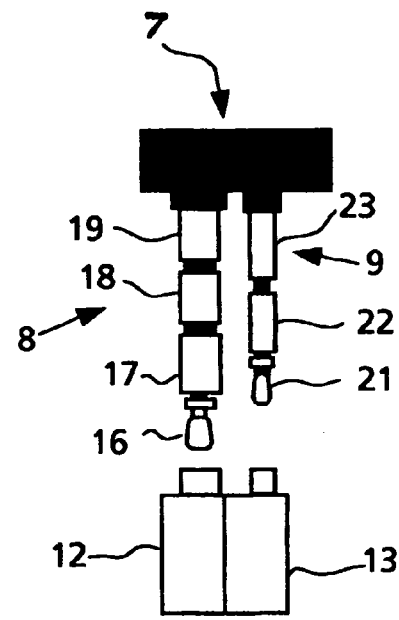
Figure 4:
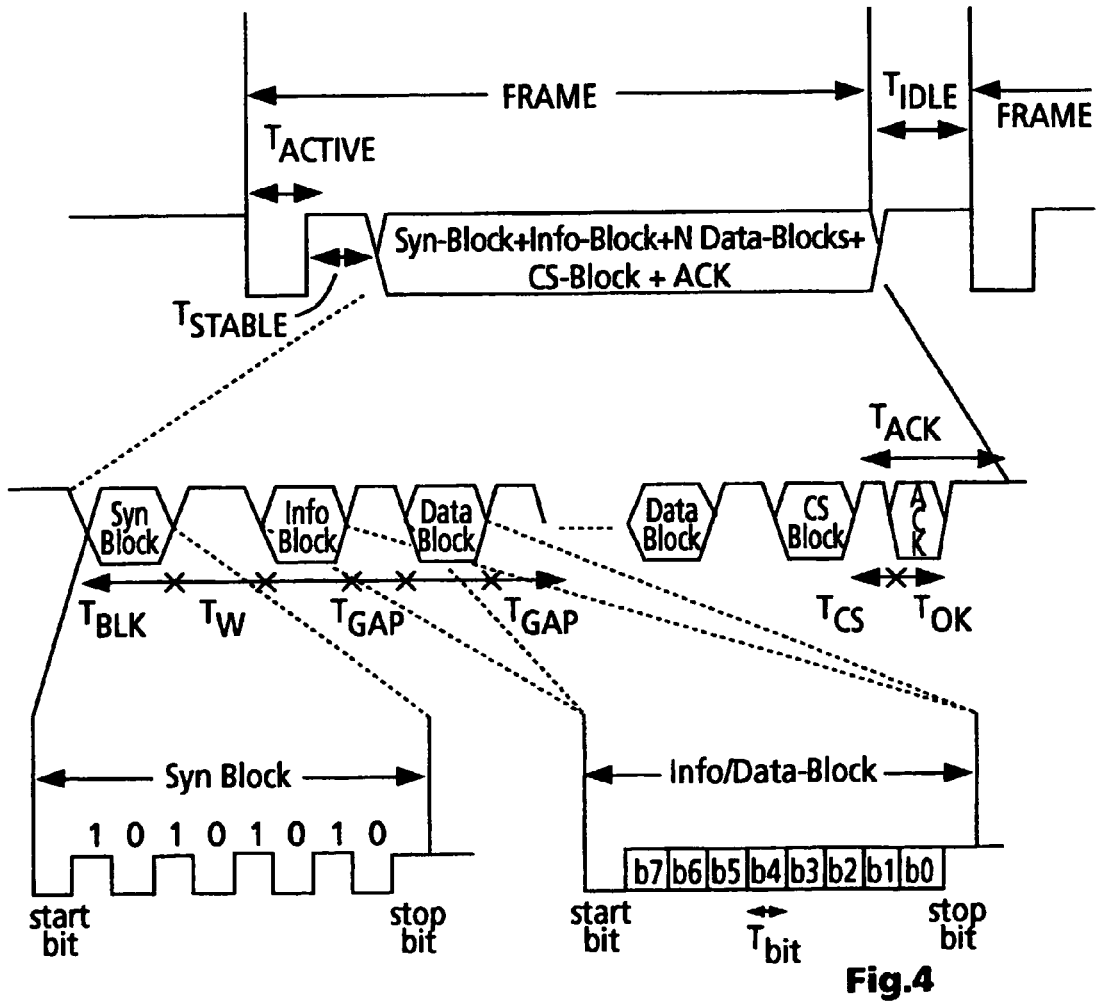
Figure 3:
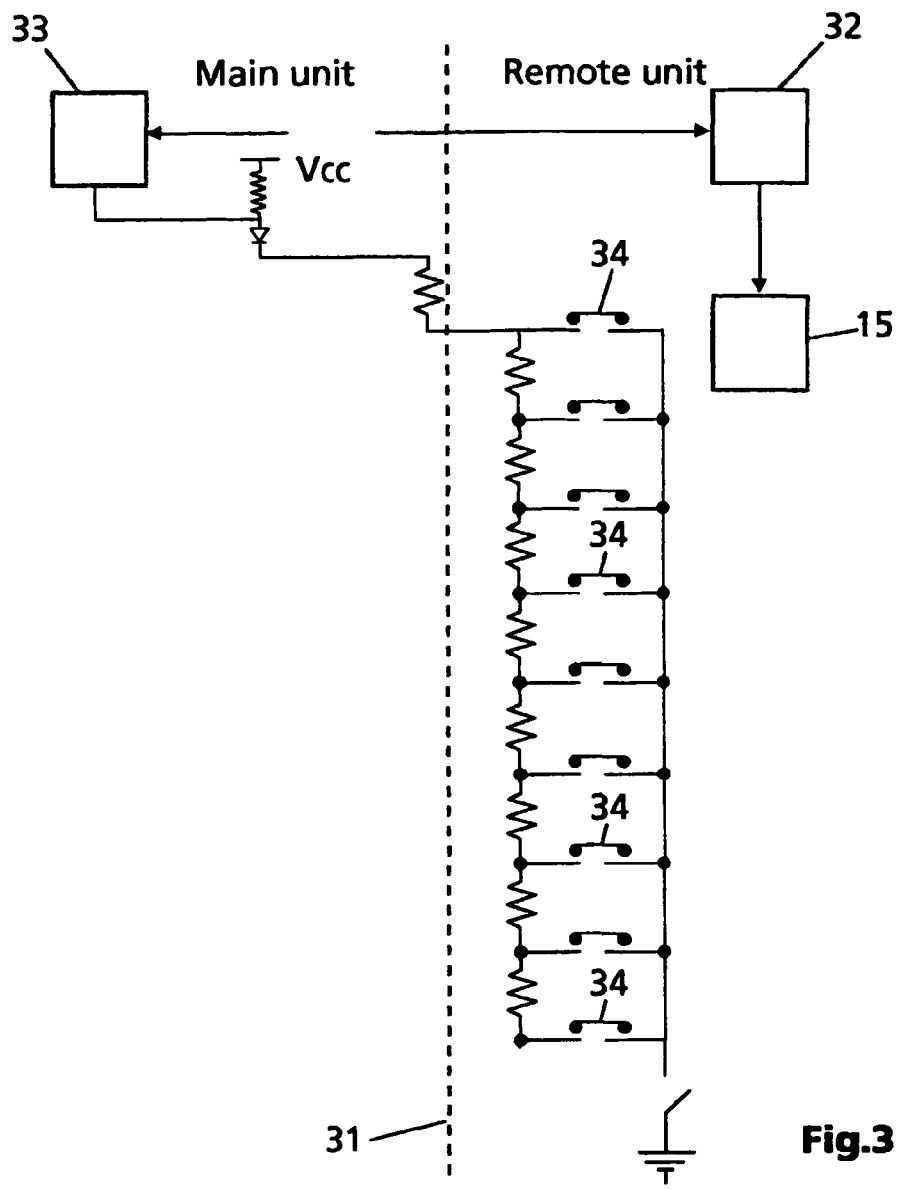

Embodiments of the invention are described with reference to the accompanying drawings, which show in:

FIG. 1*a* a top view of a portable CD player together with a wired remote control and headphones;

FIG. 1*b* a side view of the player of FIG. 1*a*;

FIG. 2*a* the mechanical arrangement of jacks and a twin-rod-plug;

FIG. 2*b* the contact configuration on the twin-rod-plug;

FIG. 3 a schematic block diagram of the main unit and the remote control unit; and FIG. 4 the data frame format and the structure of a sync block and an info/data block in the data frame.

Figure 5:
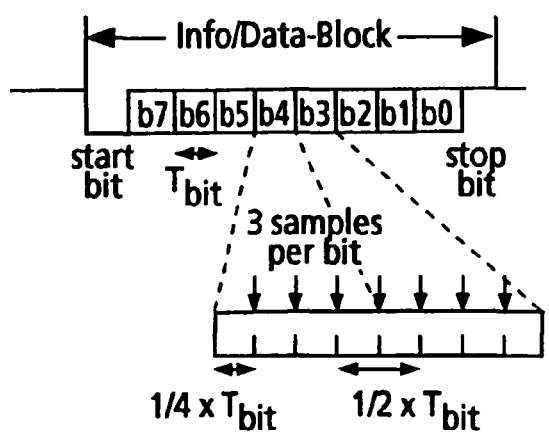

FIG. 5 the sampling of the signals on said data/control line.

EXEMPLARY EMBODIMENTS

FIG. 1*a* displays a top view of a combined CD/MP3 player comprising two units. The main unit is referenced as a whole with reference number 1. On the topside of the player a group of operating elements 2 are arranged, realized in the present embodiment as push buttons. The operating elements 2 for the volume control are arranged on a side of the housing of the player (FIG. 1*b*). The operating elements 2 enable the user of the device to enter comments like "play", "forward", "reverse" and others. The actual operating status of the player 1 is indicated on a display 3, which is realized as an LCD display.

In general, such a portable device is carried in a pocket or on a belt of the clothing when the user listens to the music via headphones. Under these circumstances it is rather inconvenient to operate the device 1 by means of the operating elements 2 because when the player is e.g. carried in a pocket the user cannot see the elements 2 nor the operational status indicated on display 3, like the song number and song title.

In order to enhance the operational comfort for the user the player is controllable by a remote control 4 forming the second unit of the player. The remote control 4 is connectable to the main unit 1 by a cable 6 terminating in a two-rod-plug 7. The plug 7 has an audio rod 8 and a data rod 9, which are integrated in a single isolating housing 10. The audio rod 8 has a larger diameter than the data rod 9 and is also longer. An audio jack 12 and a data jack 13 are provided on one side of the housing of the player 1 (FIG. 1*b*). The audio jack and the data jack 13 are arranged mechanically and electrically to accommodate the audio rod 8 and the data jack 9 respectively, for establishing a mechanical and electrical connection between the remote control 4 and the main unit 1.

The remote control 4 itself is provided with a headphone jack not shown in FIG. 1*a*. Thereby, a pair of headphones 11 is for sound reproduction is connectable to the remote control 4, i.e. the sound signal generated by the main unit 1 is passed through the remote control 4.

The remote control unit 4 is provided with operating elements 14 and a display 15 enabling the user to control the connected audio device. The remote control 4 is fixed to the clothing by a clip in the same way as a pan. It is therefore easily detachable off and attachable to the clothing. Hence, each time the user intends to monitor or control the audio device he can take the remote control unit into his hands effecting a good visibility of the display 15 and accessibility of the control elements 14.

FIG. 2*a* exhibits the audio jack 12, the data jack 13 and the rod plug 7 in more detail. The different diameters and lengths of the rods 8 and 9 are clearly visible. Advantageously, this arrangement prevents the inadvertent insertion of the rods 8 and 9 into the wrong jacks 12 and 13.

In FIG. 2*b* the electrical configuration of the rods 8 and 9 are shown. The audio rod 8 is a four-pole-rod having four contact regions. Contact regions 16 and 17 are associated with a left and right channel of a stereo audio signal, respectively. Contact regions 18 and 19 are associated with a ground for analog signals and the ground for digital signals respectively.

The data rod 9 is a three-pole-rod having three contact regions. Contact region 21 is reserved for receiving start-up signals, contact region 22 is attributed to digital data/control signals and contact region 23 is attributed to the supply voltage for the remote control.

The audio jack 12 has corresponding electrical contacts for the four contact regions 16 to 19 of the audio rod and the data jack 13 has corresponding contacts for the contact regions 21 to 23 of the data rod 9.

FIG. 3 schematically shows a block diagram with the main unit and the remote control unit with regard to the command and display data exchange. On the left hand side of the dashed line 31 a block diagram of the main unit is shown whereas on the right hand side of the line 31 a block diagram of the remote control unit 4 is shown. The remote control unit is provided with a microprocessor 32 to communicate with a main microprocessor 33 in the main unit and to drive the LCD display 15 for informing the user about operating modes, operating parameters, music titles, etc. For entering a control command the user activates one of the switches 34 forming a "key ladder" representing a potential divider. When one of the keys is pressed the respective voltage level is provided to the main microprocessor 33, which converts the voltage into a corresponding digital value by means of an internal A/D converter. The digital value represents a command word for the operation of the main unit 1. Further details regarding the plug types and corresponding sockets as well as regarding the power-on sequence are presented in a further European patent application of the applicant having the filing number EP 0 140 1185.2.

Next, the communication protocol that is used for transferring data from the microprocessor in the main unit to the microprocessor in the remote unit will be explained. The upper part of FIG. 4 shows the format of a data frame. What is depicted is the voltage drop between the data/control line 22 and the digital ground 19. Before data transmission begins, the data line 23 is in its idle or inactivated state, which means it is in the logical high state according to FIG. 4. For starting a data transfer the main microprocessor pulls the data line 22 down to the digital ground potential, which corresponds to the logical low value. This is shown on the upper left side of FIG. 4. Data line 22 is pulled down to ground level for a time period called $T_{active}$. This time period equals for example 4 ms. If the remote micro-controller samples the data line 22 in its sleep mode once every 3 ms, the set-up of time period $T_{active}$ with 4 ms guarantees that the activated potential ("low" level) can be safely detected by the remote microprocessor. After elapse of this time period $T_{active}$, the main µP releases the data line 22 and it goes back to the inactivated state, which is the logical high state for a second time period $T_{stable}$. The time period $T_{stable}$ is predefined to last for example also 4 ms. Within this time period the microprocessor in the remote controller must obtain a stabilized fast clock.

Following the time period $T_{stable}$ data will be transferred in a number of data blocks. Between each two data blocks a short idling time period $T_{gap}$ is positioned where the remote controller has got some time to shift the received data block into a buffer memory and for example to make the update for a calculated checksum. The number of data blocks transmitted in a data frame is variable. Four types of blocks are defined. The first data block concerns a synchronization block in which a specific bit pattern is transmitted to the remote microprocessor. The structure of this synchronization block is also shown in FIG. 4, see the lower part of FIG. 4. The sync block comprises an eight bit data word having the specific pattern 10101010. In front of this bit pattern a start bit is transmitted and behind it a stop bit is located. The microprocessor of the remote controller uses the falling edges of the sync block data word to tune its internal timer in order to achieve the accurate sampling frequency on the transmission line. Behind the sync block a waiting time $T_w$ is preserved before transmitting the next data block. This gives the remote microprocessor time to prepare reception for the coming data words. This time period can for example be set to be 4 ms. Next, an info block is transferred from main microprocessor to the remote microprocessor. This info block contains an eight bit data word N. The meaning of this data word N is explained in the table below.

| N | Meanings | Number of Data Blocks to follow |
|---|---|---|
| 0 | Turn all pixels off | 0 |
| 1–253 | Indicates the Number of Data Blocks to follow | As specified by N |
| 254 | Reserved for future use | — |
| 255 | Turn all pixels on | 0 |

When N is equal to zero or equal to 255, there will be no data block transferred in the data frame. With the value N=0 the remote microprocessor receives the command to turn off all the pixels of the LCD display in their remote controller. With the number N=255 the remote microprocessor will get the complementary command to turn all pixels of the LCD screen on. The value N=254 is reserved for future use and does not have a specific command associated with it at the moment. For all other cases the value N indicates the number of data blocks that will be transferred after the info block in the data frame. The structure of an info/data block is also shown in the lower part of FIG. 4. Each data block contains likewise an eight bit data word surrounded by a start bit and a stop bit. These significant bits 0–6 represent the pixel number of the LCD display and with the MSB bit 7 it is indicated whether this pixel is set to the on-state "1" or the off-state "0". Of course each pixel of the LCD screen can be uniquely addressed and it can be set or reset under control of such a data word. At the end of a data frame a checksum block is transmitted last. It contains the checksum for the complete data frame. After sending this block the main microprocessor will leave the data/control line 22 inactive (i.e. logical high state) and start polling the data line for acknowledgement. The main microprocessor will poll for a period of $T_{ack}$ as shown in FIG. 4. If the logical low level is not detected within the time period $T_{ack}$, the transmission of the data frame is considered failed and a retransmission will take place four more times at maximum. If all five transmissions fail the remote controller is considered not to be available and then no further LCD data will be transmitted until a plug insertion is subsequently detected.

The time period $T_{CS}$ behind the checksum block is the time the remote microprocessor takes to perform the final checksum calculation and to switch the port connected to the data line 22 to the requested output mode. Only if both checksums namely the calculated checksum and the received checksum corresponds to each other, the remote microprocessor will pull the data line to the activated level (low level) to assert positive acknowledgment. Main MCU will detect this level on the data line and can then prepare the next data frame transferal. The time period $T_{OK}$ in FIG. 4 is the time where the remote microprocessor must keep the data line low to assert positive acknowledgement. Both time periods $T_{CS}+T_{OK}$ must not exceed the time period $T_{ack}$. After the acknowledgement period the data line will be released from both microprocessors so that it has its idle level which corresponds to the logical high state in FIG. 4. During the time $T_{idle}$ the data line remains at this level. The time $T_{idle}$ preferably is defined to be as long as the maximum allowed time for updating the LCD display in the remote controller.

The operations of the remote microprocessor are summarized as follows:

Step 1: LCD data line is connected to the interrupt/IO port INT1 of the remote microprocessor.

Step 2: The remote microprocessor detects the "low level" on the data line 22 during the time period $T_{active}$.

Step 3: The remote microprocessor switches on its fast clock oscillator.

Step 4: Upon stabilization of the fast clock oscillator, the remote microprocessor switches to fast clock or normal operation mode.

Step 5: The remote microprocessor samples the data/control line signals at the fastest sampling rate until the first falling edge of the sync block is detected.

Step 6: Upon detection of the first falling edge of the sync block on the INT1 interrupt input the interrupt service routine starts its internal timer.

Step 7: Upon detection of the second falling edge of the sync block, the interrupt service routine for interrupt input INT1 measures the time difference that corresponds to two bit periods and restarts the timer.

Step 8: The steps 6 and 7 are repeated until all five falling edges of the sync block data word have passed.

Step 9: The average value of the bit time $T_{bit}$ is calculated.

Step 10: The remote microprocessor prepares receipt of subsequent info block, and data blocks and the checksum block.

Step 11: The interrupt for interrupt input INT1 is enabled.

Step 12: The first falling edge of the subsequent info/data/checksum block (i.e. falling edge of start bit) triggers in each case the INT1 interrupt.

Step 13: In this step the INT1 interrupt is disabled and the internal timer is started with a time-out that equals to one bit period $T_{bit}$ to skip the start bit.

Step 14: For sampling the subsequent bit, the internal timer is set so that three samples of each bit period are taken. This is shown in FIG. 5.

Step 15: The value of the bit according to the three samples is determined.

Step 16: Step 14 and 15 are repeated until all A8 bits of a block are retrieved.

Step 17: The remote μP calculates the interim checksum.

Step 18: Here the steps 11–17 are repeated until the last block (i.e. checksum block) is received.

Step 19: If the calculated checksum matches the received checksum block, the INT1 port of the remote microprocessor will be configured as an output port and the output port will be set to logical low value for the time period $T_{OK}$ in order to make a positive acknowledgement via the data line. The data line is therefore driven in both directions and that is why the data line can be characterized as a bi-directional data line.

The invention claimed is:

1. Method for serial transfer of data between two electronic bus stations over a bus connection where a first line is dedicated to data/control signals and a second line is dedicated to a power supply voltage $V_{cc}$ or ground, comprising the steps of:
   i) starting a data transfer in a first direction by pulling the first line to an activated potential low or high for a first period of time;
   ii) after elapse of the first period of time leaving said first line inactive for a second period of time; and
   iii) commencing data transmission via said first and second lines after elapse of said second period of time.

2. Method according to claim 1, wherein the first line is pulled to a potential corresponding to a logical "low" state of the data/control line instead i) and the inactive state instead ii) corresponds to a potential corresponding to a logical "high" state.

3. Method according to claim 1, wherein the first period of time is longer than a period in which a bus station listening to said first line is polling the first line to detect the starting of a data transfer.

4. Method according to claim 1, wherein the second period of time is shorter than said first period of time.

5. Method according to claim 1, wherein data is transmitted after said second period of time in form of blocks, with an idling time between each two blocks, in which the first line remains in said inactive state.

6. Method according to claim 5, wherein a first block transferred in a data frame is a synchronization block in which a specific bit pattern is transferred for synchronization purposes.

7. Method according to claim 6, wherein the idling time after said sync block is longer than the idling time between each two data blocks.

8. Method according to claim 5, wherein a second block transferred in a data frame is an information block in which a number of data blocks to be transferred in the data frame is transferred to a receiving end.

9. Method according to claim 5, wherein with a last data block in the data frame a checksum is transferred and after transferal of said checksum the transmitting station releases said first line to the inactive state.

10. Method according to claim 9, wherein a receiving station compares a calculated checksum with said received checksum and pulls within a predetermined time period said first line to said activated potential to acknowledge receipt of a data frame.

11. Method according to claim 10, wherein the checksum is calculated step by step in the receiving station, each time after receipt of a block.

12. Communication system comprising a transmitting station and a receiving station, both stations being connected by a serial bus connection where a first line is dedicated to data/control signals and a second line is dedicated to a power supply voltage or ground, wherein said transmitting station comprises means for pulling the first line to an activated potential for a first period of time, then leaving said first line inactive for a second period of time in order to start a data frame, said transmitting station further comprising means for sending data in form of a number of blocks, wherein the sending means transmits the first data block directly after elapse of said second period of time.

13. Communication system according to claim 12, said transmitting station further comprising means for leaving said first line inactive after a last block has been transferred, wherein the receiving station comprises means for pulling said first line to an active potential for a third period of time after receipt of the last block in order to acknowledge data frame receipt.

14. Communication system according to claim 12, wherein with a last block a checksum is transferred and wherein the receiving station comprises means for calculating a checksum step by step each time upon receipt of a block and for comparing the calculated checksum with a received checksum, said receiving station giving an acknowledgement if the calculated checksum matches the received checksum.

15. Communication system according to claim 12, wherein the transmitting station is integrated in a consumer electronic product in particular CD player and said receiving station is integrated in a wired remote control for the consumer electronic product.

* * * * *